United States Patent
Naitou et al.

(10) Patent No.: US 9,821,459 B2
(45) Date of Patent: Nov. 21, 2017

(54) MULTI-JOINT ROBOT HAVING FUNCTION FOR REPOSITIONING ARM

(71) Applicant: FANUC CORPORATION, Minamitsuru-gun, Yamanashi (JP)

(72) Inventors: Yasuhiro Naitou, Yamanashi (JP); Soichi Arita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/742,090

(22) Filed: Jun. 17, 2015

(65) Prior Publication Data

US 2015/0367510 A1    Dec. 24, 2015

(30) Foreign Application Priority Data

Jun. 20, 2014 (JP) .................. 2014-127617

(51) Int. Cl.
| | |
|---|---|
| G05B 19/04 | (2006.01) |
| G05B 19/18 | (2006.01) |
| B25J 9/16 | (2006.01) |
| B25J 13/08 | (2006.01) |

(52) U.S. Cl.
CPC ........... B25J 9/1633 (2013.01); B25J 9/1676 (2013.01); B25J 13/085 (2013.01); *G05B 2219/40201* (2013.01); *G05B 2219/40582* (2013.01); *Y10S 901/09* (2013.01)

(58) Field of Classification Search
CPC ...... B25J 13/085; B25J 9/1633; B25J 9/1674; B25J 9/22; B25J 9/16; B25J 9/1638; B25J 9/1641; B25J 9/1671; Y10S 901/09; G05B 19/423; G05B 19/42
See application file for complete search history.

(56) References Cited

U.S. PATENT DOCUMENTS

| | | | |
|---|---|---|---|
| 6,298,283 B1 * | 10/2001 | Kato | B25J 9/1676 318/16 |
| 2006/0071625 A1 * | 4/2006 | Nakata | B25J 9/1633 318/568.12 |

(Continued)

FOREIGN PATENT DOCUMENTS

| | | |
|---|---|---|
| JP | 08-071969 A | 3/1996 |
| JP | 10177409 A | 6/1998 |

(Continued)

*Primary Examiner* — Rachid Bendidi
(74) *Attorney, Agent, or Firm* — RatnerPrestia

(57) ABSTRACT

A multi-joint robot using substantially one sensor, capable of performing a proper repositioning motion of an arm of the robot. The controller has a disturbance torque estimating part which estimates a first disturbance torque and a second disturbance torque, by calculating a torque generated by a mass and motion of the robot and subtracting the calculated torque from the first torque and the second torque detected by a torque detecting part. The controller has a repositioning commanding part which generates a motion command for rotating each axis so that the disturbance torque is reduced, when the disturbance torque exceeds a torque threshold. Since the axis is repositioned based on the motion command, a portion of the robot pushed by the operator is repositioned, whereby the operator can easily perform one's work without using a teaching board, etc.

3 Claims, 2 Drawing Sheets

(56) References Cited

U.S. PATENT DOCUMENTS

| | | | | |
|---|---|---|---|---|
| 2012/0130541 A1* | 5/2012 | Szalek | ............... | B25J 9/106 700/258 |
| 2014/0121837 A1* | 5/2014 | Hashiguchi | ............ | B25J 9/0087 700/261 |
| 2014/0163735 A1* | 6/2014 | Yasuda | ............... | B25J 9/1633 700/258 |
| 2014/0316436 A1* | 10/2014 | Bar | ............... | A61B 19/2203 606/130 |

FOREIGN PATENT DOCUMENTS

| | | |
|---|---|---|
| JP | 10-291182 A | 11/1998 |
| JP | 2005-293098 A | 10/2005 |
| JP | 2006021287 A | 1/2006 |
| JP | 2008006517 A | 1/2008 |
| JP | 2010120124 A | 6/2010 |
| JP | 2011025367 A | 2/2011 |

\* cited by examiner

MULTI-JOINT ROBOT HAVING FUNCTION FOR REPOSITIONING ARM

BACKGROUND OF THE INVENTION

1. Field of the Invention

The preset invention relates to a multi-joint robot provided with at least two axes and having a function for evacuating or repositioning an arm thereof.

2. Description of the Related Art

Recently, a cooperative robot, which is operated while sharing a working area with a human, has become popular. For the safety of the human, such a cooperative robot may be configured to be stopped or suspended when the human approaches or contacts the cooperative robot.

However, since the cooperative robot shares the working area with the human, the suspended robot may interfere with the work of the human. In such a case, the robot is desired to be able to be repositioned. As a means for repositioning the robot, it may be desired for the human to be able directly push and easily move the robot without operating a teaching board, for example.

As relevant prior art documents, JP H08-071969 A discloses that a soft-floating servo control is used so that, when a strong external force is applied to a robot, a servomotor for driving a mechanical unit of the robot does not forcibly output a large torque which exceeds the external force.

Further, JP H10-291182 A discloses an arm drive unit for correctly detecting a force (or disturbance) applied to an arm by an operator, in which a magnetic torque sensor is attached between the arm and a speed reducer of a motor for driving the arm.

In JP H08-071969 A, a motor current is used to calculate the torque applied to an axis. However, in such a method, the correct torque may not be obtained, since the calculated torque may include a frictional influence. As a result, the force of the direction thereof applied by the human cannot be correctly detected.

On the other hand, as described in JP H10-291182 A, when a torque sensor is arranged on each arm, it is possible to eliminate the influence of the friction. However, it is necessary to provide the torque sensors as many as the arms (axes), which raises a cost of the robot (in particular, a multi-joint robot).

SUMMARY OF THE INVENTION

Therefore, an object of the present invention is to provide a multi-joint robot using substantially one sensor, capable of performing a proper repositioning of an arm of the robot.

According to the present invention, there is provided a multi-joint robot, comprising: a first axis having a first vector in an axial direction of the first axis; a second axis having a second vector in an axial direction of the second axis, an inner product of the first and second vectors being equal to zero without depending on a posture of the multi-joint robot; a controller which controls the multi-joint robot; and a sensor having a torque detecting part which detects a first torque about the first axis and a second torque about the second axis, wherein the controller comprises: a disturbance torque estimating part which calculates a first disturbance torque about the first axis and a second disturbance torque about the second axis second, by subtracting a torque generated by a mass and motion of the multi-joint robot from the first torque and the second torque detected by the torque detecting part, respectively; and a repositioning commanding part which generates a first motion command for rotating the first axis in a direction so that the first disturbance torque is reduced, when the first disturbance torque exceeds a first torque threshold, and generates a second motion command for rotating the second axis in a direction so that the second disturbance torque is reduced, when the second disturbance torque exceeds a second torque threshold.

In a preferred embodiment, the sensor further has a force detecting part which detects a force applied to the sensor; the controller has an external force estimating part which estimates an external force applied to the multi-joint robot, by subtracting a force generated by the mass and the motion of the multi-joint robot from the force detected by the force detecting part; and the repositioning commanding part generates the first motion command when the first disturbance torque exceeds the first torque threshold and when the estimated external force is smaller than a predetermined external force threshold, and generates the second motion command when the second disturbance torque exceeds the second torque threshold and when the estimated external force is smaller than the predetermined external force threshold.

In this case, the repositioning commanding part may specify the first torque threshold as a value of a first disturbance torque about the first axis when a portion of the multi-joint robot, which is not displaced by the motion of the first axis, is pushed by a force corresponding to the external force threshold, and may specify the second torque threshold as a value of a second disturbance torque about the second axis when a portion of the multi-joint robot, which is not displaced by the motion of the second axis, is pushed by a force corresponding to the external force threshold.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
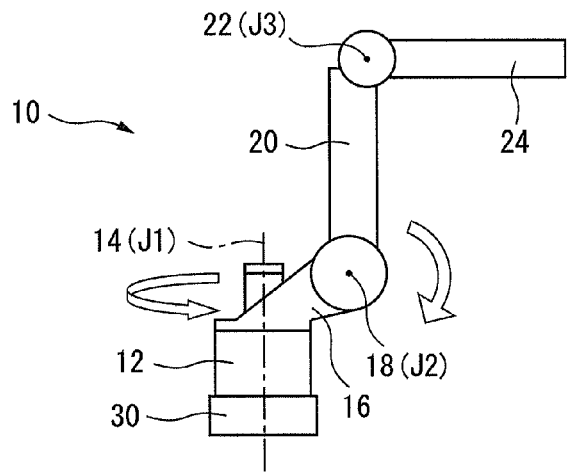
FIG. 1 shows an example of a schematic configuration of a multi-joint robot mechanical unit according to the present invention.

FIG. 1 shows an example of a schematic configuration of a multi-joint robot (mechanical unit) 10 according to the present invention. Robot 10 has a base (J1 base) 12, a rotating body (J2 base) 16 arranged on base 12 and rotatable about a first axis (J1 axis) 14, and an upper arm (J2 arm) 20 arranged on rotating body 16 and rotatable about a second axis (J2 axis) 18. J1 axis 14 and J2 axis 18 are configured so that an inner product of a first vector of J1 axis 14 and a second vector of J2 axis 18 is always equal to zero without depending on the posture of robot 10. In other words, J1 axis 14 and J2 axis 18 may intersect with each other at right angles, or, J1 axis 14 and J2 axis 18 may be skew lines so that the first and second vectors are at 90 degrees to each other. In addition, as shown in FIG. 1, robot 10 may further have a forearm (J3 arm) 24 arranged at a front end of upper arm 20 and rotatable about a third axis (J3 axis) 22, and forearm 24 is not essential.

Figure 2:
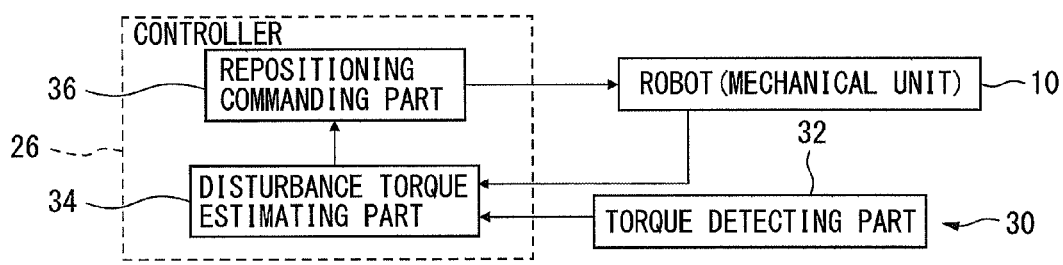
FIG. 2 is a functional block diagram showing a configuration example of a controller for controlling the robot mechanical unit of FIG. 1.

FIG. 2 is a functional block diagram showing a configuration example of a controller 26 for controlling robot mechanical unit 10 of FIG. 1. As shown in FIG. 1, robot mechanical unit 10 has a (one) sensor 30 attached to a lower part of J1 base 12, and sensor 30 has a torque detecting part 32 which detects a first torque about J1 axis 14 and a second torque about J2 axis 18 (FIG. 2). Torque detecting part 32 can detect torques of at least two axes intersecting with each other at right angles. For example, torque detecting part 32 is a torque sensor capable of detecting torques about X-, Y- and Z-axes intersecting with each other at right angles. In addition, since J1 axis 14 and J2 axis 18 are configured so that an inner product of the vectors thereof is always equal to zero, it is not necessary to arrange the torque detecting part on each axis. In other words, both the first torque and the second torque can be detected by arranging substantially one sensor at a substantially one portion of the robot.

In the example of FIG. 1, although sensor 30 (or the torque detecting part) is attached to the lower part of J1 base 12, the sensor may be arranged on any portion of robot mechanical unit 10 as long as the sensor can detect the first torque about J1 axis 14 and the second torque about J2 axis 18. Concretely, sensor 30 is positioned nearer the base of robot 10 than J1 axis, for example, may be positioned between J2 base 16 and J1 base 12.

As shown in FIG. 2, controller 26 has a disturbance torque estimating part 34 which estimates (or calculates) a first disturbance torque about J1 axis and a second disturbance torque about J2 axis, by calculating a torque generated by a mass and motion of robot 10 and subtracting the calculated torque from the first torque and the second torque detected by torque detecting part 32. In this regard, the torque generated by the mass and the motion of robot 10 may be calculated based on a dimension and mass of each portion of robot 10, and the velocity and acceleration of each axis, etc. Such a torque estimating means may be conventional, and a similar example thereof is described in JP 2005-293098 A filed by the same applicant as the present invention.

Controller 26 has a repositioning commanding part 36 which generates a first motion command for rotating J1 axis in a direction so that the first disturbance torque is reduced, when the first disturbance torque exceeds a first torque threshold, and generates a second motion command for rotating J2 axis in a direction so that the second disturbance torque is reduced, when the second disturbance torque exceeds a second torque threshold. For example, in case that robot 10 is a cooperative robot which is operated while sharing a working area with the human, the first torque threshold is specified as a value of torque applied to J1 axis when a portion of the robot (e.g., J2 base 16) is pushed so as to reposition the portion by a certain distance in order that the human (or the operator, etc.) within the working area can easily perform one's work. In other words, in such a case, since J1 axis is rotated (or repositioned) based on the first motion command so that the first disturbance torque is reduced, the portion of robot 10 pushed by the operator is repositioned, whereby the operator can easily perform one's work without using a teaching board, etc.

Similarly, in case that robot 10 is the cooperative robot which is operated while sharing the working area with the human, the second torque threshold is, for example, specified as a value of torque applied to J2 axis when a portion of the robot (e.g., J2 arm 20) is pushed so as to reposition the portion by a certain distance in order that the human (or the operator, etc.) within the working area can easily perform one's work. In other words, also in such a case, since J2 axis is rotated (or repositioned) based on the second motion command so that the second disturbance torque is reduced, the portion of robot 10 pushed by the operator is repositioned, whereby the operator can easily perform one's work without using the teaching board, etc.

As explained above, in the present invention, when the operator pushes the robot so that the robot performs the repositioning motion, the repositioning motion regarding the plurality of axes can be performed by means of one sensor (or a sensor positioned at one site of the robot). Therefore, it is not necessary to arrange a torque sensor on each of the plurality of axes, whereby a cost of the robot may be reduced.

Figure 3:
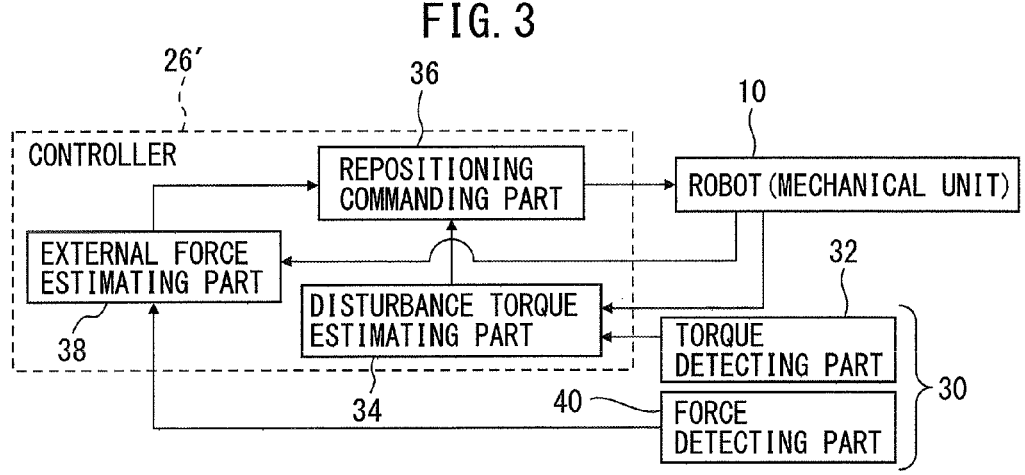
FIG. 3 is a functional block diagram showing another configuration example of the controller for controlling the robot mechanical unit of FIG. 1.

FIG. 3 is a functional block diagram showing another configuration example of the controller for controlling robot mechanical unit 10 of FIG. 1. A controller 26' of FIG. 3 further has an external force estimating part 38 which estimates an external force applied to sensor 30, in addition to disturbance torque estimating part 34 and repositioning commanding part 36 as shown in FIG. 2. In this case, sensor 30 further has a force detecting part 40 which detects a force applied to sensor 30, in addition to torque detecting part 32 as shown in FIG. 2. As sensor 30 of FIG. 3, for example, a six-axis force sensor may be used, and such a sensor may be commercially available. When the six-axis force sensor is used, the torque of each axis can be detected more precisely than when the motor current is used.

In the example of FIG. 3, sensor 30 has both the torque detecting function and the force detecting function. Then, external force estimating part 38 estimates the external force applied to robot 10, by calculating the force applied to sensor 30 generated by the mass and the motion of robot 10 and subtracting the calculated force from the force detected by sensor 30 (or force detecting part 40). In this regard, the force generated by the mass and the motion of robot 10 may be calculated based on the dimension and mass of each portion of robot 10, and the velocity and acceleration of each axis, etc. Such an external force estimating means may be conventional, and thus a detailed explanation thereof is omitted.

Repositioning commanding part 36 generates the first motion command for rotating J1 axis in a direction so that the first disturbance torque estimated by disturbance torque estimating part 34 is reduced, when the first disturbance torque exceeds the first torque threshold and when the estimated external force estimated by external force estimating part 38 is smaller than a predetermined external force threshold. Further, repositioning commanding part 36 generates the second motion command for rotating J2 axis in a direction so that the second disturbance torque estimated by disturbance torque estimating part 34 is reduced, when the second disturbance torque exceeds the second torque threshold and when the estimated external force estimated by external force estimating part 38 is smaller than the predetermined external force threshold.

When the robot during the repositioning motion collides with the operator or peripheral equipment, etc., the operator may be injured or the peripheral equipment may be damaged by continuing the repositioning motion of the robot. However, in the example of FIG. 3, the repositioning motion is not performed when the external force exceeds the predetermined external force threshold, even if the first or second disturbance torque exceeds the first or second torque threshold. In other words, the external force threshold may be experimentally determined as a force, which exceeds a range of force normally applied by the operator to the robot for performing the repositioning motion, and is within a range of force judged as dangerous when the force is applied to the operator or the peripheral equipment. Therefore, when controller 26' as shown in FIG. 3 is used, the situation, in which it is not preferable that the robot start or continue the repositioning motion, can be automatically detected and avoided.

As in controller 26' of FIG. 3, when both the torque value of each axis and the external force applied to the robot are used for judging as to whether or not the repositioning motion of each axis of robot 10 can be performed, it may be advantageous that the criteria for the judgment include the position of the portion of robot 10 pushed by the operator (concretely, the distance between the portion pushed by the operator and sensor 30). Hereinafter, a concrete example thereof will be explained.

For example, in robot 10 of FIG. 1, even when the operator pushes J1 base 12, the first disturbance torque about J1 axis can be larger than a certain value (or the first torque threshold), whereby the repositioning motion of J1 axis (or the rotating motion of rotating body 16) may be generated. However, since J1 base 12 is not displaced by the rotation of rotating body 16, the repositioning motion of J1 axis is unintended motion for the operator.

Then, the external force threshold as described above is referred to as force "F," and the torque threshold of J1 axis (or the first torque threshold) is determined as the maximum value of the first disturbance torque when the portion of robot 10 (e.g., J1 base 12 or sensor 30), which is not displaced by the motion of J1 axis, is pushed by force F. In other words, a disturbance torque, generated when a portion of sensor 30 farthest from J1 axis 14 (in the example of FIG. 4, an outer surface of a cylindrical region 42 about J1 axis 14 in which sensor 30 is inscribed) is pushed by force F in a tangential direction regarding the rotation about J1 axis, is specified as the first torque threshold. By virtue of this, when the force pushing J1 base 12 or sensor 30 is not larger than force F, the first disturbance torque does not exceed the first torque threshold, whereby the repositioning motion about J1 axis cannot be performed. On the other hand, when the force pushing J1 base 12 or sensor 30 is larger than force F, the force applied to robot 10 exceeds external force threshold F, and thus the repositioning motion about J1 axis also cannot be performed.

Figure 4:
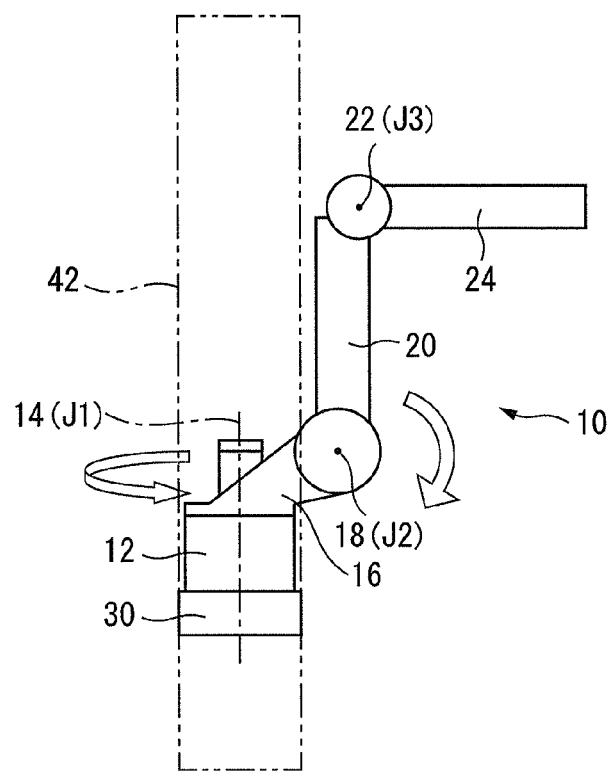
FIG. 4 shows an area of the robot mechanical unit of FIG. 1 where a repositioning motion of J1 axis does not occur even when an operator pushes the area.

Accordingly, in order to perform the repositioning motion about J1 axis, the operator must push a portion of robot 10 (i.e., a portion outside region 42) away from sensor 30 by a predetermined distance (in the example of FIG. 4, away from J1 axis 14 by a distance larger than a radius of cylindrical region 42). For example, when the operator pushes upper arm 20 outside region 42, it is possible to generate the first disturbance torque larger than the first torque threshold due to the force smaller than external force threshold F. Therefore, the repositioning motion about J1 axis can be performed.

Figure 5:
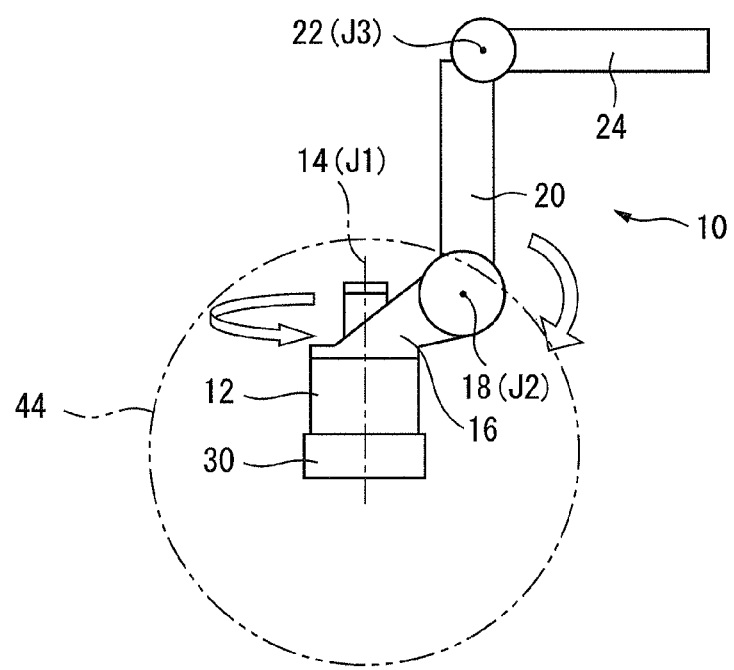
FIG. 5 shows an area of the robot mechanical unit of FIG. 1 where a repositioning motion of J2 axis does not occur even when an operator pushes the area.

FIG. 4 shows the repositioning motion about J1 axis, and FIG. 5 shows the repositioning motion about J2 axis. For example, even when the operator pushes rotating body 16, the second disturbance torque about J2 axis can be larger than a certain value (or the second torque threshold), whereby the repositioning motion of J2 axis (or the rotating motion of upper arm 20) may be generated. However, since rotating body 16 is not displaced by the rotation of upper arm 20, the repositioning motion of J2 axis is unintended motion for the operator.

Then, the external force threshold as described above is referred to as force "F," and the torque threshold of J2 axis (or the second torque threshold) is determined as the maximum value of the second disturbance torque when J1 base 12, sensor 30 or rotating body 16 is pushed by force F. In other words, a disturbance torque, generated when a portion of sensor 30 farthest from J2 axis 18 (in the example of FIG. 5, an outer surface of a cylindrical region 44 about (a gravity center or representative point of) sensor 30 in which rotating body 16 (or a portion which is not displaced by the rotation of J2 axis) is inscribed) is pushed by force F in a tangential direction regarding the rotation about J2 axis, is specified as the second torque threshold. By virtue of this, when the force pushing J1 base 12, sensor 30 or rotating body 16 is not larger than force F, the second disturbance torque does not exceed the second torque threshold, whereby the repositioning motion about J2 axis cannot be performed. On the other hand, when the force pushing J1 base 12, sensor 30 or rotating body 16 is larger than force F, the force applied to robot 10 exceeds external force threshold F, and thus the repositioning motion about J2 axis also cannot be performed.

As explained above, by defining region 42 including the portion which is not displaced by the rotation of J1 axis, the repositioning motion of J1 axis is not performed by pushing the portion within region 42, while the repositioning motion of J1 axis can be performed only when the portion outside region 42. Similarly, by defining region 44 including the portion which is not displaced by the rotation of J2 axis, the repositioning motion of J2 axis is not performed by pushing the portion within region 44, while the repositioning motion of J2 axis can be performed only when the portion outside region 44. Due to such a configuration, it can be automatically and correctly judged as to whether or not which axis should be repositioned depending on the position of the portion pushed by the operator. In particular, such a configuration is effective when the sensor is relatively away from the rotation axis (J1 and J2 axes, etc.). In addition, the examples of FIGS. 4 and 5 may be combined.

According to the present invention, the torque of each axis can be detected more correctly than when the motor current is used, further, the repositioning motion of the plurality of axes can be performed by means of substantially one sensor (or a sensor positioned at one site of the robot). Therefore, it is not necessary to position a torque sensor at each of the plurality of axes, whereby a cost of the robot may be reduced.

While the invention has been described with reference to specific embodiments chosen for the purpose of illustration, it should be apparent that numerous modifications could be made thereto, by one skilled in the art, without departing from the basic concept and scope of the invention.

The invention claimed is:
1. A multi-joint robot, comprising:
a first axis having a first vector in an axial direction of the first axis;
a second axis having a second vector in an axial direction of the second axis, an inner product of the first and second vectors being equal to zero without depending on a posture of the multi-joint robot;
a controller which controls the multi-joint robot; and a single sensor or a sensor positioned at one site of the robot having a torque detecting part which detects a first torque about the first axis and a second torque about the second axis, wherein the controller:
- calculates a first disturbance torque about the first axis and a second disturbance torque about the second axis second, by subtracting a torque generated by a mass and motion of the multi-joint robot from the first torque and the second torque detected by the torque detecting part, respectively;
- compares the first disturbance torque to a first torque threshold;
- controls the multi-joint robot to rotate along the first axis in a direction so that the first disturbance torque is reduced, when the comparison indicates that the first disturbance torque exceeds the first torque threshold;
- compares the second disturbance torque to a second torque threshold; and
- controls the multi-joint robot to rotate along the second axis in a direction so that the second disturbance torque is reduced, when the comparison indicates that the second disturbance torque exceeds the second torque threshold.

2. The multi-joint robot as set forth in claim 1, wherein the sensor further has a force detecting part which detects a force applied to the sensor, wherein the controller:
- estimates an external force applied to the multi-joint robot, by subtracting a force generated by the mass and the motion of the multi-joint robot from the force detected by the force detecting part,
- controls the multi-joint robot to rotate along the first axis when the first disturbance torque exceeds the first torque threshold and when the estimated external force is smaller than an external force threshold, and
- controls the multi-joint robot to rotate along the second axis when the second disturbance torque exceeds the second torque threshold and when the estimated external force is smaller than the external force threshold.

3. The multi-joint robot as set forth in claim 2, wherein the controller:
- specifies the first torque threshold as a first value of a first disturbance torque about the first axis when a first portion of the multi-joint robot, which is not displaced by the motion of the first axis, is pushed by a force corresponding to the external force threshold; and
- specifies the second torque threshold as a second value of a second disturbance torque about the second axis when a second portion of the multi-joint robot, which is not displaced by the motion of the second axis, is pushed by a force corresponding to the external force threshold, and wherein the first portion of the multi-joint robot is different than the second portion of the multi-joint robot.

* * * * *